Sept. 6, 1932. W. H. DELAHAYE 1,875,571
BRAKE
Filed Dec. 2, 1929

INVENTOR:
WALTER H. DELAHAYE.

BY ATTORNEY

Patented Sept. 6, 1932

1,875,571

UNITED STATES PATENT OFFICE

WALTER H. DELAHAYE, OF OTTAWA, ONTARIO, CANADA, ASSIGNOR TO BENDIX BRAKE COMPANY, OF SOUTH BEND, INDIANA

BRAKE

Application filed December 2, 1929. Serial No. 410,939.

This invention relates to brakes and has for its object to provide an improved Servo brake, employing a Servo shoe which is assembled on one of the brake shoes to having a sliding movement in regard thereto, and to provide a simple mechanism for utilizing the movement of the Servo shoe so that such movement is efficiently transmitted to the main shoe. The mechanism for accomplishing this result is of a simple nature and one that is designed to retain its relative adjustment to the remainder of the device with a minimum amount of attention.

Figure 1:
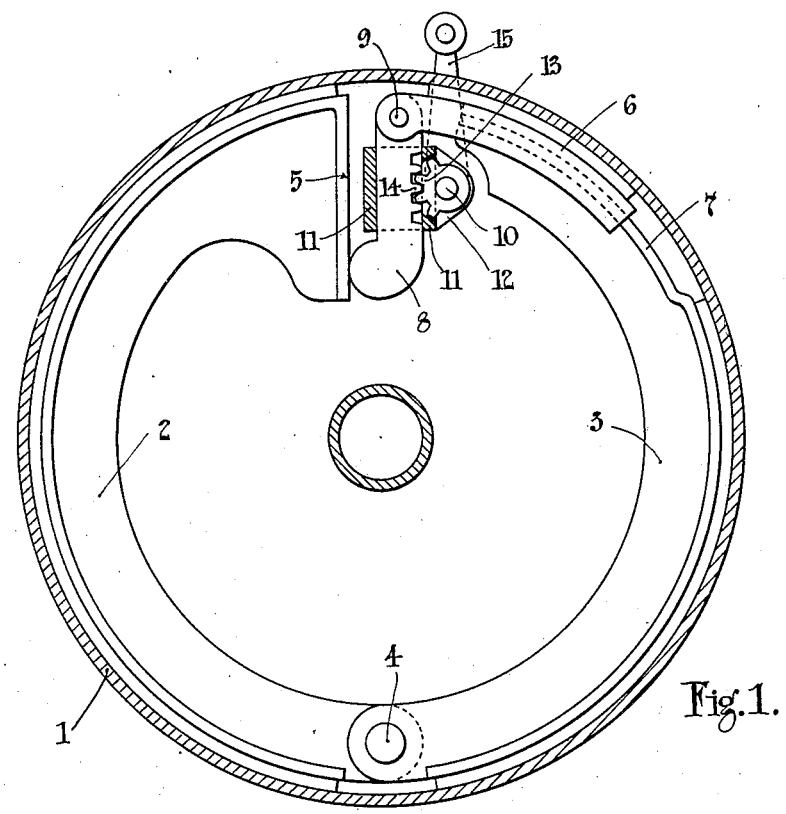
Figure 2:
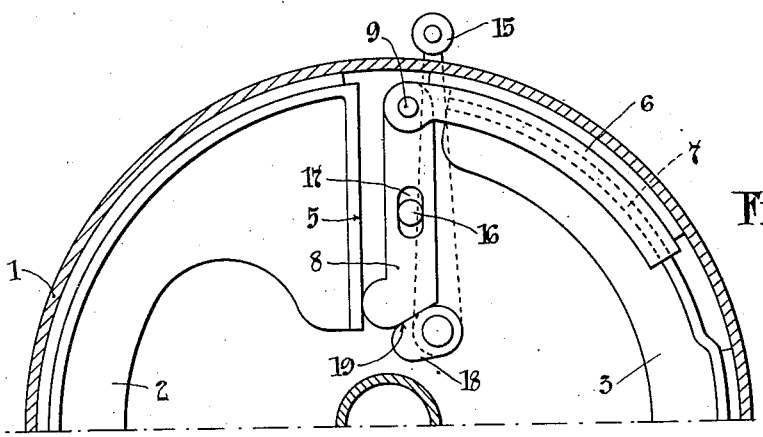

Two modifications of the invention are illustrated by way of example in the accompanying drawing, Figure 1 being an elevation of one form of the brake, and Figure 2 being a similar view of another form.

Referring to the drawing in which similar reference characters are used to denote similar parts throughout the views 1 denotes a brake drum and 2 and 3 are a pair of shoes pivoted in the usual manner at 4. The shoe 2 carries a flat end surface 5 similar to that found in ordinary cam operated brakes. The shoe 3 differs from ordinary construction and is similar to that disclosed by me in several co-pending applications, particularly in application Serial No. 410,941, filed December 2, 1929. A Servo shoe 6 is mounted to slide on an offset bearing portion 7 of the shoe 3 and this Servo shoe is connected to a lever 8 by means of a pivot 9. The lever 8 is adapted to turn about a pivot 10 and to have a sliding movement in regard thereto. This is accomplished by mounting the lever 8 slidably in a fitting 11, which has a pair of ears 12 by which it is freely carried on the pivot 10. The pivot 10 is conveniently shown in the form of an operating shaft and between the ears 12 it carries a segmental gear 13 adapted to mesh with the rack teeth 14 cut in that portion of the lever 8 which lies within the bore of the fitting 11, the fitting being recessed between the ears 12 to allow engagement of the teeth through the opening so provided.

The operation of the brake is self-apparent and only a brief description will be given.

Operation of the lever 15 will cause the gear 13 to raise the lever 8, causing it to slide in the fitting 11. This outward movement of the lever 8 will cause the Servo shoe 6 and the shoe 3 which carries it to move into engagement with the drum 1. If the latter is in motion in a clockwise direction the Servo shoe will be caused to slide on the shoe 3. As a consequence of this movement the lever 8 will be rocked about the pivot 10, the mounting of the fitting 11 on the pivot 10 by means of the ears 12 allowing this rocking movement. The free end of the lever 8 will thus be brought into engagement with the face 5 of the shoe 2 in such a manner as to cause an outward effort to be exerted thereon. This effort will be directly in proportion to the speed of the drum and to the force with which the brake is applied by the operator.

In Figure 2 of the drawing the lever 8 is mounted in a different manner, the fitting 11 being dispensed with. The lever 8 is mounted on a pivot 16 and provision is made for the necessary sliding movement by a slot 17. In this form the operating lever 15 instead of operating a shaft having a gear thereon, such as the shaft 10, operates a cam 18 which is adapted to engage the end surface 19 of the lever 8. Movement of the cam will cause outward movement of the lever similar to that produced by the gear 13 and rack connection of the form shown in Figure 1. On movement of the Servo shoe with the drum 1 the lever is free to pivot on the pivot 16 causing its free end to engage the shoe 2.

Having thus described the construction of two embodiments of the invention it is the intention of the applicant to cover all other modifications as may fall within the scope of the appended claims.

I claim:

1. In a brake of the class described and in combination with a fixed support therefor, a pair of shoes anchored thereon, a Servo shoe, a lever mounted for sliding movement and for pivotal movement about a fixed pivot, means for causing the sliding movement and means for using the rocking movement caused by travel of the Servo shoe with the drum of the element to be braked to further apply the shoes.

2. In a brake of the class described and in combination with a fixed support therefor, a pair of shoes pivoted on the support, one of said shoes having a Servo shoe mounted thereon for sliding movement, a surface on the free end of the other shoe, a lever mounted for pivotal and sliding movement between the ends of the shoes, the outer end of the lever being pivoted to the Servo shoe and the inner end of the lever being adapted to engage said surface of the other shoe, and means to cause the sliding movement of the lever above referred to.

3. In a brake of the class described and in combination with a fixed support therefor, a pair of shoes on the support, a Servo shoe sliding on one of said shoes adjacent the free end thereof, means for causing the engagement of the Servo shoe and the shoe carrying it with a brake drum of the part to be braked, said means being adapted to rock on movement of the Servo shoe with the said drum and to engage the free end of the other pivoted shoe and apply it to the said drum.

4. In a drum of the class described and in combination with a fixed support therefor, a pair of shoes pivoted thereon, a Servo shoe sliding on an offset portion near the free end of one of the shoes, said Servo shoe being adjacent the free end of the carrying shoe, a guide mounted for pivotal movement, a lever adapted to have sliding movement through the guide, said lever having its outer end pivotally connected to the Servo shoe, means for causing the sliding movement of the lever through the guide, movement of the lever and guide about the pivot causing the free end of the lever to engage the free end of the other shoe and apply same to the brake drum of the part to be braked, engagement of the Servo shoe with the said drum causing the rocking movement of the guide and lever.

5. In a brake as claimed in claim 4, said means for causing the sliding movement consisting of a rockshaft carrying a gear and a rack on the lever adapted to be engaged thereby.

6. In a brake as claimed in claim 4, said guide having a bore to slidably receive the lever and means to journal it on a rockshaft for pivotal movement thereabout, the axis of the bore being spaced from the axis of the rockshaft and at right angles thereto, said lever having a section of a toothed rack thereon adapted to be engaged by a segmental gear on the rockshaft.

7. In a brake of the class described and in combination with a fixed support therefor, a pair of shoes pivoted thereon, said shoes having spaced free ends, an offset portion on one of the shoes adjacent said free end carrying a Servo shoe, said Servo shoe having sliding movement relative thereto, a lever depending from the end of the Servo shoe and lying between the spaced ends of the pivoted shoes, means to guide the lever in a radial direction, said means allowing the lever to turn about a point adjacent the centre thereof, means to force the lever outwardly in said radial direction, the free inner end of said lever being adapted on turning to engage the free end of the other shoe to cause same to engage a brake drum carried by the part to be braked.

8. In a brake of the class described in claim 7, said other shoe having an approximately radial surface on its free end adapted to be normally in engagement with the free end of the lever.

9. In a brake of the class described and in combination with a fixed support therefor, a pair of shoes pivoted thereon, said shoes having spaced free ends, one of which presents an approximately radial surface and the other of which has an unlined inwardly offset portion concentric with the axis of the brake, an arcuate Servo shoe slidably mounted on the said offset portion, a lever depending from the end of the Servo shoe and lying between the said free ends of the shoes, a guide for the said lever, said guide having a bore through which said lever may slide and means to receive a shaft at right angles to said bore and offset therefrom, a gear on the said shaft adapted to engage with a rack section on the said lever, said lever having a free inner end adapted to engage the radial end surface of the shoe and slide thereon, operation of the said shaft causing radially sliding movement with the consequent engagement of the Servo shoe with the drum carried by the part to be braked, and movement of the Servo shoe with the said drum upon the offset concentric portion of the pivoted shoe causing rocking of the lever and consequent application of an expanding force at the point of engagement of the lever and the radial surface.

10. A brake comprising friction elements, a Servo shoe slidable on one of the elements and a slidable, rockable, applying lever connected to the Servo shoe.

11. A brake comprising friction elements, a Servo shoe slidable on one of the elements and a slidable, rockable applying lever connected to the Servo shoe and means for actuating the applying lever.

12. A brake comprising friction elements, a Servo shoe slidable one one of the friction elements, a slidable, rockable applying lever pivoted to the Servo shoe and means for actuating the lever including a rack and pinion.

13. A brake comprising friction elements, a Servo shoe slidable on one of the elements, a pivoted bracket, a lever slidable in the bracket and pivotally connected to the Servo shoe and means for sliding the lever in the bracket.

14. A brake comprising a fixed support, pivotally connected friction elements positioned for movement on the support, a Servo shoe slidable on one of the friction elements, a bracket pivoted on the support, a lever slidable in the bracket and pivotally connected to the Servo shoe, a rack on the lever and a pinion cooperating therewith.

15. A brake comprising friction elements, a Servo shoe slidable on one of the elements, a fixed support and a lever pivoted to the Servo shoe slidable and rockable on the fixed support.

16. A brake comprising a backing plate, friction elements positioned for movement on the backing plate, a Servo shoe slidable on one of the friction elements, a lever pivoted to the Servo shoe, a fixed support on the backing plate and slidable, rockable connection between the fixed support and the lever.

17. A brake comprising a backing plate, friction elements positioned for movement thereon, a Servo shoe slidable on one of the friction elements, a lever pivoted to the Servo shoe, a fixed support on the backing plate engaging a slot in the lever and an operating cam for actuating the lever.

18. A brake comprising a backing plate, a rotatable drum associated therewith, friction elements positioned for movement on the backing plate and adaptable for cooperation with the drum, a Servo shoe slidably positioned on one of the friction elements, a lever pivotally connected to the Servo shoe having a portion engaging the other friction element, a fixed support on the backing plate extending through a slot in the lever and an operating cam engaging the free end of the lever.

In testimony whereof I have affixed my signature.

WALTER H. DELAHAYE.